J. M. ROHLFING.
FRICTION DRAFT GEAR.
APPLICATION FILED JUNE 10, 1914.
1,141,093.
Patented May 25, 1915.
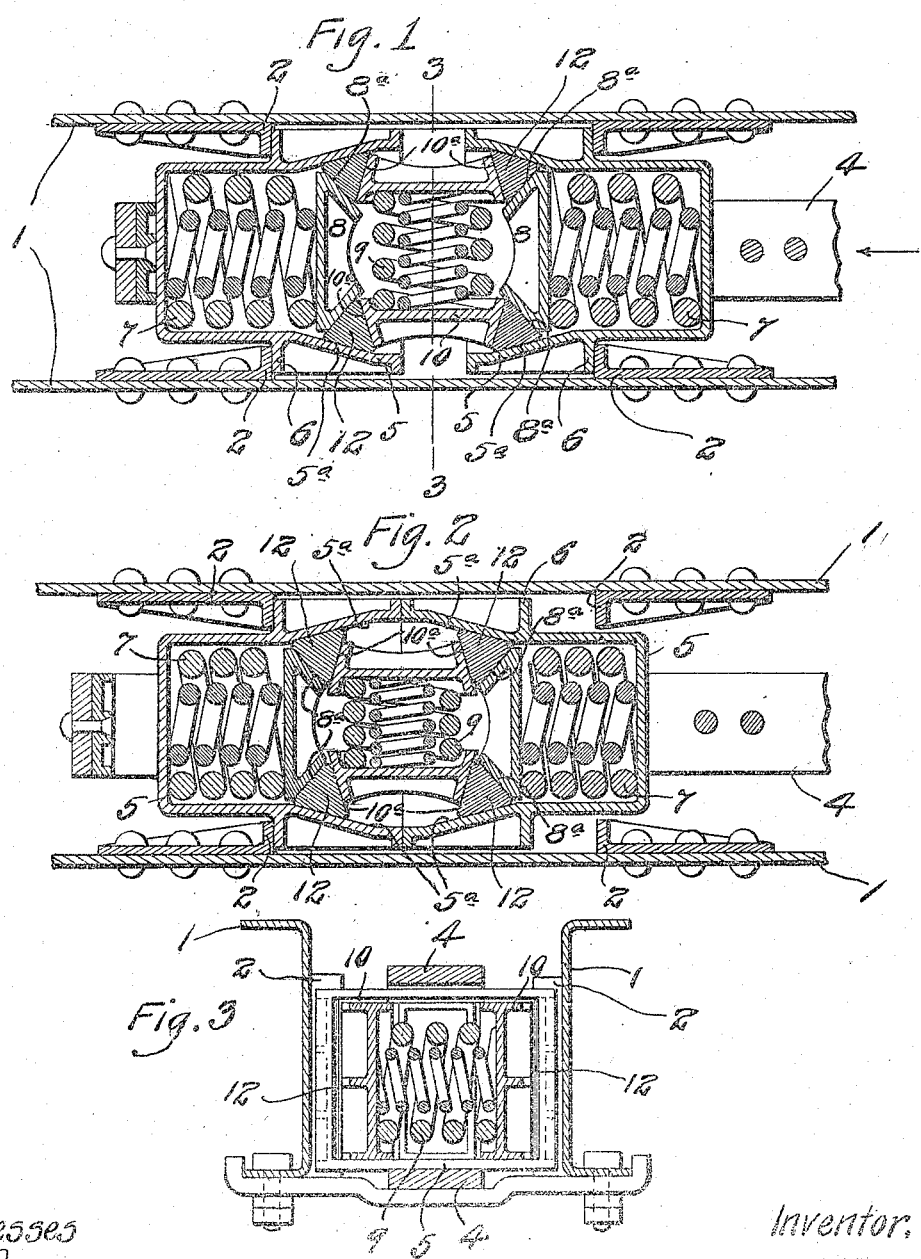
Witnesses
Inventor,
John M. Rohlfing,

UNITED STATES PATENT OFFICE.

JOHN M. ROHLFING, OF ST. LOUIS, MISSOURI, ASSIGNOR TO AMERICAN CAR AND FOUNDRY COMPANY, OF ST. LOUIS, MISSOURI, A CORPORATION OF NEW JERSEY.

FRICTION DRAFT-GEAR.

1,141,693.

Specification of Letters Patent.

Patented May 25, 1915.

Application filed June 10, 1914. Serial No. 844,176.

*To all whom it may concern:*

Be it known that I, JOHN M. ROHLFING, a citizen of the United States, residing at the city of St. Louis, State of Missouri, have invented a certain new and useful Improvement in Friction Draft-Gear, of which the following is a full, clear, and exact description, such as will enable others skilled in the art to which it appertains to make and use the same, reference being had to the accompanying drawings, forming part of this specification, in which—

Figure 1 is a cross section on the medial line of the gear showing the position of the parts with the gear in normal or expanded position. Fig. 2 is a cross section on the same line showing the position of the parts in compressed position. Fig. 3 is a vertical section approximately on line 3—3 of Fig. 1.

My invention relates to an improved form of friction draft gear, and has for its principal purpose to provide a strong and smoothly operating gear which will accommodate all buffing and pulling stresses without imparting shock to the car, and further, obviate all releasing shocks by frictionally preventing sudden recoil of the gear when relieved of buffing or pulling stresses.

As illustrated, 1 represents the draft sills having the draft lugs 2.

4 represents the yoke which embraces a pair of oppositely disposed casings 5 having the lugs 6 adapted to engage the draft lugs 2. The casings 5 carry the draft springs 7 which coöperate at their inwardly presented ends with the friction plates 8. Mounted between the friction plates 8 is a transverse spring 9 coöperating at either end with the transverse friction plates 10. The housings 5 are provided with the inclined friction faces 5ª. Loose friction elements 12 are disposed intermediate the adjacent friction plates 8, 10 and 5ª and coöperate with the friction surfaces 10ª which diverge in the direction of the center of the gear, and 8ª which converge in the direction of the center of the gear. The friction surfaces 5ª, as illustrated, diverge in the direction of the center of the gear. All of these adjacent friction surfaces have angular disposal relative to one another and support the loose friction elements 12 in contact with one another. The outer portions of the friction plates 10, when the gear is in expanded position, may contact with the inclined friction surfaces 5ª of the casings.

For the purpose of illustrating the operation of the gear, suppose that a buffing stress is imparted to the yoke, which, of course, will have a tendency to move it in the direction indicated by the arrows. This will tend to move the outer casing 5 inwardly toward the inner casing, which latter casing is held by engagement of the lugs 2 and 6.

During the inward movement of the outer casing 5, the friction surfaces 5ª will become effective upon the loose friction elements 12, and initially upon the outer edges of friction plates 10. The tendency of movement of the casing will be to force loose friction elements 12 inwardly against the influence of the draft springs 7 and the transverse spring 9. This will force the friction plates 8 inwardly against the influence of the draft springs, but not affect the friction plates 10 to any marked degree. This is due to the fact that the friction faces 8ª are disposed at greater angularity to the line of movement of friction plates 8, than are the friction faces 10ª to the line of movement of friction plates 10.

The inward movement of the yoke is rendered smooth and gradual by the frictional operation of the loose friction elements 12 upon the contacting friction surfaces. It is obvious that as the draft springs become more and more compressed, their expansive tendency will gradually increase the friction value between the loose friction elements 12 and the coöperating friction surfaces. When the draft springs have become entirely compressed, or compressed to the extent where their opposition to inward movement of friction plates 8 becomes superior to the friction value between the loose elements 12 and the friction faces 10ª, the friction plates 10 will be moved inwardly against the influence of the transverse spring 9, thus supplying an additional flexibility having an increased resistance. Thus it will be seen that, starting with a certain initial resistance, the friction value of the gear is gradually increased during the operation of the gear.

The operation will be the same, of course, in case a pulling instead of a buffing stress were applied to the yoke. Upon removal of the compressing stress, the gear expands under friction gradually and without sudden or extreme recoil. The friction plates 10 now being impelled outwardly by spring 9 effectively resist any sudden recoil of the draft springs by virtue of the fact that they maintain the loose friction elements 12 in frictional coöperation with the friction plates 8 and the friction surfaces 5ª. Consequently, the gear returns to normal with a practically constant movement which is free from any jar or recoil due to acceleration by the draft springs.

I am aware that various changes and modifications may be made in the construction of the devices without departing from the spirit of my invention as indicated in the following claims.

What I claim is:

1. A draft gear including a movable member, a draft spring coöperating therewith and effective in the direction of movement thereof, a transverse spring effective transversely of the direction of movement of the said member, friction plates coöperating with said springs and friction elements having frictional engagement with said friction plates and said member, and being retained in coöperation therewith by said springs.

2. A draft rigging comprising in combination, a longitudinally movable casing, a draft spring coöperating therewith and effective in the direction of movement of said casing, a transverse spring effective in a direction transversely of said draft spring, friction plates coöperating with said transverse spring, and friction elements coöperating with said friction plates, said draft spring and said casing and operable by the latter to cause compression of said draft spring and said transverse spring upon compression movement of said casing.

3. In a draft rigging, the combination of oppositely disposed movable casings, a draft yoke and draft lugs coöperating therewith, oppositely disposed draft springs coöperating with said casings and effective in the direction of movement thereof, a transverse spring disposed intermediate said draft springs and effective in a direction transversely thereof, friction plates coöperating with said transverse spring, and friction elements coöperating with said casings, said friction plates and said draft springs and operable by the casings to produce compression of said draft springs and said transverse spring upon a pulling or buffing movement of either of said casings.

4. In a draft rigging in combination, oppositely disposed casings, friction elements coöperating therewith, said casings being provided with friction faces coöperating with said friction elements and operable to move the latter inwardly upon compression movement of either of said casings and draft springs and a transverse spring having frictional coöperation with said friction elements and operating to oppose inward movement of said friction elements.

5. A draft rigging comprising the combination of movable casings, draft springs effective in the direction of movement of said casings, friction plates coöperating with said draft springs, a transverse spring, friction plates coöperating with said transverse spring, and friction elements coöperating with said casings and with said first and said last mentioned friction plates, said friction elements constituting a medium through which said casings and said friction plates coöperate in mutual opposition to one another.

6. In a draft rigging, a draft spring, a movable casing provided with inwardly presented diverging friction faces, a friction plate provided with inwardly converging friction faces and coöperating with said casing through the medium of the spring, transversely operating friction plates provided with inwardly presented diverging faces and coöperating with each other through a transversely acting spring, and loose friction elements having frictional coöperation with said casing and said friction plates.

7. In a draft rigging, longitudinally movable friction plates, transversely movable friction plates, draft springs coöperating with the former, a transverse spring coöperating with the last mentioned friction plates, friction elements coöperating with said longitudinally movable and said transversely movable friction plates, and a movable member having friction faces adapted to coöperate with said friction elements to move the same on said friction plates.

8. In a device of the class described, oppositely movable casings, oppositely disposed draft springs coöperating therewith, a transversely operating spring disposed intermediate said draft springs, a transversely movable friction plate coöperating with said transverse spring, and loose friction elements coöperating with said friction plate, each of said friction elements also coöperating with a casing and a draft spring.

9. In a draft gear, members oppositely movable by buffing and pulling stresses, loose friction elements coöperating therewith, said members being formed with friction faces, friction plates, draft springs coöperating with said elements and friction plates and operable to move the elements on the said plates, and a transverse spring coöperating with said friction elements and adapted to move the same on the friction plates.

10. In a draft gear, in combination, a pair of opposed casings, a pair of spring-separated laterally movable members having inclined outer ends, springs seated within the casings, and wedging elements interposed between the springs and the laterally movable members.

11. In a draft gear, in combination, a pair of casings having their side walls flaring, a laterally compressible abutment between the casings, springs seated within the casings, a set of wedging elements interposed between each spring and the abutment.

12. In a draft gear, in combination, a pair of casings, a laterally compressible abutment between the casings, and comprising a pair of chambered members whose outer ends are wedge-shape and a spring urging such members apart, springs seated within the casings, and a set of friction elements located between each of the last-named springs and the abutment.

13. In a draft gear, in combination, two longitudinally movable casings having their open ends facing and their side walls flaring, a pair of inwardly movable friction elements housed within each casing and having inclined faces in constant engagement with the side walls of the casings, a third pair of inwardly movable friction elements interposed between and engaging the first-mentioned pairs of friction elements and having oppositely inclined surfaces.

In testimony whereof I hereunto affix my signature in the presence of two witnesses, this 3d day of June, 1914.

JOHN M. ROHLFING.

Witnesses:
 JAMES J. COOPER,
 PAUL M. BEARD.